C. G. OLSON.
GRINDER SPINDLE.
APPLICATION FILED APR. 12, 1920.

1,433,223.

Patented Oct. 24, 1922.

Inventor
Carl G. Olson
By Cheever & Cox
Attys.

Patented Oct. 24, 1922.

1,433,223

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GRINDER SPINDLE.

Application filed April 12, 1920. Serial No. 373,150.

*To all whom it may concern:*

Be it known that I, CARL G. OLSON, a citizen of the United States, residing at Chicago, in the county of Cook and State of Illinois, have invented a certain new and useful Improvement in Grinder Spindles, of which the following is a specification.

My invention relates to spindles and their mountings and while the general principles of the invention are applicable to the rotation of various objects, they are nevertheless especially useful in connection with the rotating of grinders and other objects which require to be rotated at high speed. Therefore, for the sake of brevity, the invention may be said to relate to grinder spindles, and will be described as embodied in a device of this character. In some respects my present invention is analogous to the one shown in Patent No. 1,232,714, granted to me July 10, 1917 for tool holder and driver, and in certain regards may be considered as an improvement over it. Some objects, notably grinders, require ordinarily, to be rotated at high speed to obtain the best results. I have frequently operated grinding points, such as the one shown in Patent No. 1,232,715, issued to me July 10, 1917 for drive for machine tools and grinding wheels, such as the one shown in Patent No. 1,259,770 issued to me March 19, 1918 for grinding machine, at a speed of 20,000 R. P. M. At these high speeds there is a tendency to produce injurious vibration, and futhermore high speed devices naturally are subject to a greater amount of wear than low speed devices, other things being equal, and this wear results in a looseness of the bearings which, among other disadvantages, reduces the accuracy of the work turned out. One of the objects of my invention is to produce a tool holder or spindle in which the wear will be automatically compensated for and, second, to provide means whereby this may be accomplished by parts which are accurately balanced. In this connection it may be stated that it is my purpose, in the most developed form of the invention, to provide for automatically taking up the wear both radially and axially, thus preventing lost motion either crosswise or lengthwise of the spindle. Due to the high speeds there is more or less heating with consequent expansion of the parts. My construction compensates for this, also. Another object of my invention is to provide screw threaded mechanism for holding the grinder or other rotary object and to provide means for preventing the unscrewing of the mechanism when in service.

I accomplish my objects by the mechanism illustrated in the accompanying drawings in which—

Like numerals denote like parts throughout the several views.

Figure 1:
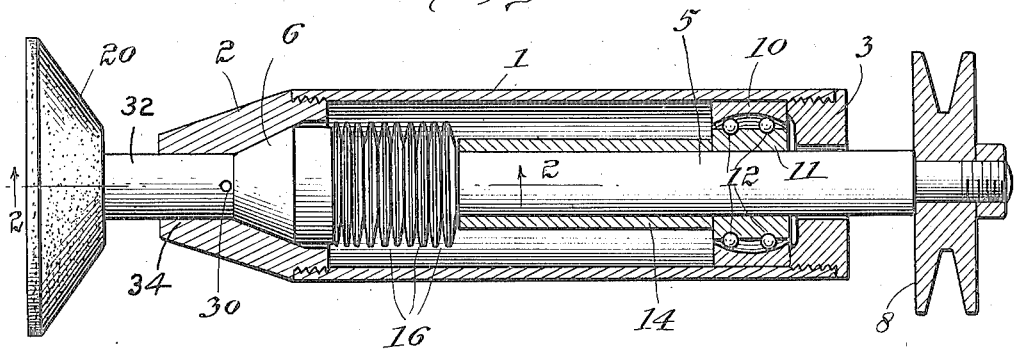
Figure 1 is an assembly view of the complete device in the form of a grinder spindle, the housing and some of the other parts being shown in axial section.
Figure 2:
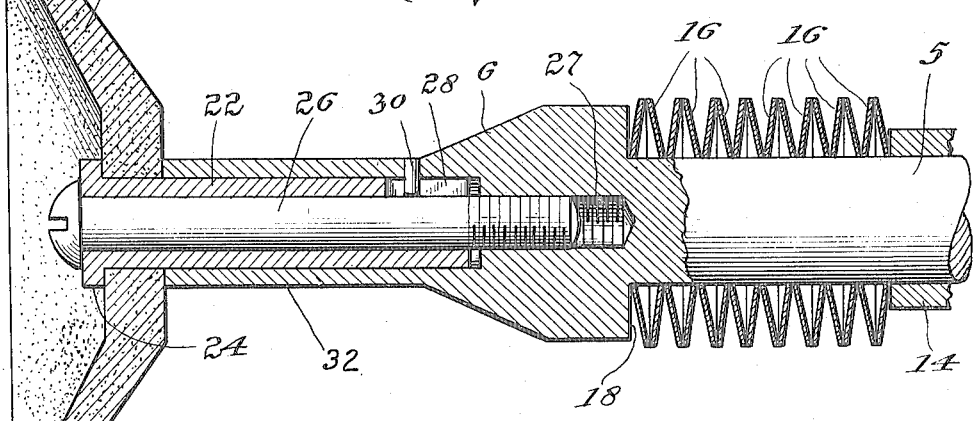
Figure 2 is a sectional view on the line 2—2, Figure 1.
Figure 3:
Figure 3 is a fragmentary detail showing the inner slotted end of the sleeve which cooperates with the spindle and holding screw to hold the rotary object in place.
Figure 4:
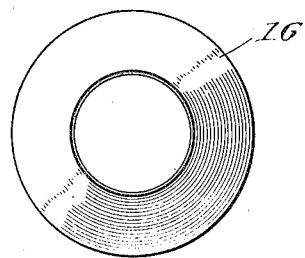
Figure 4 is a face view of one of the dished annular springs which form part of the take-up mechanism.
Figure 5:
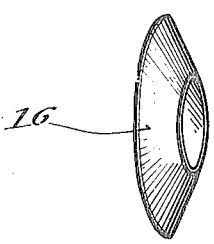
Figure 5 is a perspective view of one of these springs.

In the form illustrated, the housing 1 has a conical bearing 2 screwing into it at the forward end and a plug 3 screwing into it at the rear end. The spindle proper 5 has a conically tapered shoulder 6 near its forward end journaled in the bearing 2. At its rear end is fastened a pulley 8 for rotating it. The rear portion of the spindle is supported in a ball bearing of the ring type, the same having an outer ring 10 which fits within the housing and bears against the plug 3. The inner ring 11 fits slidingly over the spindle and has annular grooves forming ball races for the anti-friction balls 12. A sleeve 14 fits slidingly over the spindle and at one end bears against the inner ring 11 and at the other end bears against the innermost one of a set of concave resilient discs or dished springs 16. These springs are preferably of light gauge spring steel and are faced oppositely in pairs encircling the spindle between the forward end of sleeve 14 and the annular shoulder 18 formed on the spindle at the rear of the conical shoulder 6. As the parts 11, 14 and 16 fit slidingly on the spindle, it follows that when the parts are properly adjusted the plug 3 presses lightly forward on the outer ring 10 which in turn presses forward on certain of the anti-friction balls 12.

These exert a light forward pressure on the inner ring 11, which exerts a light forward pressure on the sleeve 14, which exerts a light forward pressure on the springs 16, which exert a light forward pressure on the spindle and cause its conically tapered shoulders 6 to seat closely within the conical bearing 2. In other words, the springs 16, are in practice, put under a slight compresive strain and this causes the spindle to seat closely in the conical bearing at the forward end of the housing, thus automatically taking up the wear and preventing both side play and end play. Consequently, the forward end of the spindle is always held truly entered with the result that the grinding wheel 20 or other object to be rotated, is always accurately centered and thus enabled to produce accurate work.

The grinding wheel 20 abuts the forward end of the spindle and encircles the forward end of a holding sleeve 22. The forward end of the spindle is counter-bored to accommodate sleeve 22 and the sleeve itself is provided with an annular flange 24 at the forward end for engaging the outer surface of the wheel and holding it in close contact with the forward end of the spindle. The sleeve is clamped tightly against the grinding wheel by means of a screw 26 which screws into a threaded counterbore 27 in the spindle. A slot 28 extends longitudinally at the inner end of sleeve 22 and a pin 30, which is fastened in the spindle, extends into this slot and prevents the sleeve from rotating but permits it to slide longitudinally to accommodate itself to the thickness of the grinding wheel.

In practice, when the parts are assembled as shown the springs 16 keep the forward end of the spindle closely seated in the conical bearing and automatically compensate for any wear that may occur. As the springs are, geometrically considered, "bodies of revolution,"—that is, are of uniform cross section when cut by any diametral plane, their center of mass is, of course, coincident with the axis of the spindle and the parts are therefore perfectly balanced. Consequently they may be run at high speeds without vibration, the tendency to wear is reduced to a minimum, and the spindle is at all times held truly centered.

The construction of the sleeve 22 and associated parts for clamping the grinding wheel in place, is of great utility in that it is simple in form and may be readily adjusted and easily accommodates itself to grinding wheels of different thickness. Furthermore, there is no tendency for the parts to become loosened when in service. The negative torque induced in the grinding wheel when the latter is in contact with an object to be ground, is not transmitted to the clamping screw 26 but solely to the sleeve and spindle; but the slot and pin connection between the sleeve and spindle makes it impossible for the grinding wheel to produce any relative rotary movement between these two parts, and consequently, there is nothing to exert any torque upon the clamping screw itself. This makes it possible to dispense with lock nuts and other special contrivances for making the connection secure. This construction also has another advantage and that is that a minimum thickness of metal at the front surface of the grinding wheel is sufficient for holding the wheel in place. In other words, the room for adjustment of the parts occurs within the body of the spindle, and the amount of metal which lies against the outer or forward surface of the grinding wheel is always simply the thickness of the head of the screw and of the annular flange 24. Thus the grinding wheel may be brought up close to objects located opposite to the end of the spindle.

It will be noted that the outer end 32 of the spindle is cylindrical and is journaled within a cylindrical portion 34 in the housing. This assists in preventing side play (transverse to the axis) in the event the grinding wheel is crowded too hard against the work and the springs 16 are forced to yield slightly and permit the conical shoulder 6 to recede from its conical bearing.

The grinding wheel may act either on the convex or concave side. When acting on the convex side there is, of course, no such tendency to compress the springs, but when acting on the concave side and forced too hard against the work, the springs may be forced to yield, as described, and under such conditions the cylindrical portion of the spindle will serve to prevent the side play which might otherwise result. The construction has another advantage and that is that if the grinding wheel or other tool is pressed too hard against the work, it will yield inwardly towards the housing instead of breaking, but if allowed sufficient time will finally remove the stock and produce the desired contour in the work. In other words, by yielding inward, breakage of the grinding wheel is avoided, but as the springs continue to keep the grinding wheel in close contact with the work, the desired configuration will finally be produced.

Another advantage of my construction, resulting from the shape of the springs, is that there is no tendency created either at high or low speeds to throw the lubricating oil towards one end of the housing or the other, as would be the case if a helical spring were employed. In ordinary practice the housing is fairly well filled with oil to keep the bearings lubricated and experience has shown that with helical springs at high speed the oil is forced toward one end or the other end of the housing and is gradually forced out through the end of the housing, whereas with the construction here illustrated there is no such tendency.

Attention is called to my Patent 1,393,817 for grinder spindle. In that case the annular springs or discs do not rotate with the spindle, although they are free to creep around. In the present case they rotate in unison with the spindle. In the present case there are two rings or sleeves 11 and 14 and these rotate with the spindle and put the springs under pressure. In the said copending case are parts which are analogous but they lie adjacent to the inner surface of the housing instead of adjacent to the spindle and while they are free to creep around they are not, properly speaking, rotary elements.

Having thus described my invention, what I claim is new and desire to secure by Letters Patent is:

1. In a device of the class described, a housing, a spindle journaled in the housing and having a thrust bearing at one end, and a plurality of concave spring discs encircling the spindle and having their concave sides faced alternately in opposite directions and adapted to hold the spindle in contact with the thrust bearing.

2. A spindle having a housing provided with a thrust bearing at one end, a spindle proper journaled in said housing and adapted to abut said thrust bearing, a plurality of concave, resilient discs encircling the spindle and arranged in pairs, concavity to concavity, said discs being adapted to press the spindle towards said thrust bearing, and means anchored to the housing for holding the springs to their work.

3. In a device of the class described, a housing having a conical bearing, a spindle having a conical shoulder journaled in said bearing, and spring takeup mechanism based upon the housing for pressing the spindle toward its conical bearing, said takeup mechanism having concave discs faced alternately in pairs and arranged coaxially with the spindle.

4. A spindle having a housing provided with a conically tapered bearing at the forward end and an end piece at the rear end, a spindle proper having a conical portion adapted to seat in said bearing, an annular shoulder on the spindle behind the conical portion, dished annular springs adapted to bear against said shoulder, a ball bearing near the rear end of said spindle and housing, said ball bearing having an inner ring and an outer ring, one adapted to transmit thrust to the springs and the other to receive thrust from said end piece, whereby pressure is transmitted from the housing to the spindle to keep the latter seated in the conical bearing.

5. In a device of the class described, the combination of a spindle having a conical shoulder, a housing having a conical bearing for the shoulder, an annular spring encircling the spindle and adapted to press against the spindle in a direction to force the conical shoulder into the conical bearing, a sleeve encircling the spindle and adapted to exert pressure against the spring, a ring encircling the spindle and adapted to press against the sleeve; the spring, sleeve and ring being adapted to rotate in unison with the spindle, and a ball bearing for the ring adapted to exert endwise thrust thereon.

In witness whereof, I have hereunto subscribed my name.

CARL G. OLSON.